United States Patent
Kleihorst et al.

(10) Patent No.: US 7,020,342 B1
(45) Date of Patent: Mar. 28, 2006

(54) SCALABLE CODING

(75) Inventors: Richard Petrus Kleihorst, Eindhoven (NL); Renatus Josephus Van Der Vleuten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 722 days.

(21) Appl. No.: 09/830,108

(22) PCT Filed: Aug. 24, 2000

(86) PCT No.: PCT/EP00/08271

§ 371 (c)(1),
(2), (4) Date: Apr. 23, 2001

(87) PCT Pub. No.: WO01/17268

PCT Pub. Date: Mar. 8, 2001

(30) Foreign Application Priority Data

| Aug. 27, 1999 | (EP) | 99202775 |
| Nov. 18, 1999 | (EP) | 99203839 |
| Mar. 23, 2000 | (EP) | 00201037 |

(51) Int. Cl.
*G06K 9/36* (2006.01)

(52) U.S. Cl. .................... 382/250; 382/248

(58) Field of Classification Search ............. 382/250, 382/248, 240, 232; 375/240.2, 240.18, 240.24, 375/240.1; 348/39.5, 403–408; 358/426.01–426.16
See application file for complete search history.

(56) References Cited

U.S. PATENT DOCUMENTS

| 4,972,260 A | 11/1990 | Fujikawa et al. ......... 358/136 |
| 5,278,646 A | 1/1994 | Civanlar et al. ......... 358/133 |
| 5,793,892 A | 8/1998 | Pan et al. .................. 382/232 |
| 5,914,751 A | 6/1999 | Korth ........................ 348/409 |

FOREIGN PATENT DOCUMENTS

| EP | 0402954 A2 | 6/1990 |
| EP | 0466475 A2 | 7/1991 |
| WO | WO9819273 | 10/1997 |
| WO | WO9837700 | 2/1998 |
| WO | 9916250 | 6/1998 |

OTHER PUBLICATIONS

Kleihorst et al, Implementation of DCT-domain motion estimation and compensation, 1998 IEEE Workshop on Signal Processing Systems, Oct. 8-10, 1998, pp. 53-62.*

G.K. Wallace; "The JPEG Still Picture Compression Standard", Multimedia Engineering Digital Equipment Corp., Maynard, Massachusetts, 8087 IEEE Transactions on Consumer Electronics 38, Feb. 1992, No. 1, NY, USA, XP 000297354.

J. Li et al; "An Embedded DCT Approach to Progressive Image Compression", Integrated Media Systems Center and Department of Electrical Engineering-Systems, University of Southern CA.

C. Yamaitsu et al; "An Experimental Study for a Home-Use Digital VTR", Cetral Research Lab, Matsushita Electric, Industrial Co. Ltd, Osaka, Japan, Development Center, IEEE Transactions on Consumer Electronics, vol. 35, No. 3, Aug. 1989.

* cited by examiner

*Primary Examiner*—Yon J. Couso

(57) ABSTRACT

The invention proposes a method of and a device for coding a signal (S) to obtain a scalable bit-stream (O). The signal (S) comprises blocks of values. Each block is represented (20) as a sequence of bit planes and the values are scanned and transmitted (21, 23) in an order of decreasing bit plane significance. For each bit plane the scanning and transmitting (21,23) are performed in a rectangular scan zone ($R_{MAX}/C_{MAX}$) starting from a corner of the block (usually an upper-left corner). Preferably, the scanning and transmitting (21,23) is performed on each block individually. The produced bit-stream (O) is quantized to a desired bit-rate by simple truncating (3) the bit-stream (O) at a desired position.

15 Claims, 4 Drawing Sheets

SCALABLE CODING

The invention relates to a method of and a device for scalable coding.

The invention further relates to an encoder, a camera system, a method of decoding, a scalable decoder, a receiver, a scalable bit-stream and a storage medium.

WO 99/16250 discloses an embedded DCT-based still image coding algorithm. An embedded bit-stream is produced by the encoder. The decoder can cut the bit-stream at any point and therefore reconstruct an image at a lower bit-rate. Since an embedded bit-stream contains all lower rates embedded at the beginning of the bit-stream, the bits are ordered from the most important to the less important. Using an embedded code, the encoding simply stops when the target parameter as the bit count is met. In a similar manner, given the embedded bit-stream, the decoder can cease decoding at any point and can produce reconstructions corresponding to all lower-rate encoding. The quality of the reconstructed image at this lower rate is the same as if the image was coded directly at that rate.

The DCT is orthonormal, which means that it preserves the energy. An error in the transformed image of certain amplitude will produce an error of the same magnitude in the original image. This means that the coefficients with the largest magnitudes should be transmitted first because they have the largest content of the information. This means that the information can also be ranked according to its binary representation, and the most significant bits should be transmitted first.

Coding is done bit-plane by bit-plane. The DCT coefficients are scanned and transmitted in an order starting from the upper left corner (corresponding to the DC coefficient) and ending in the lower right corner of each DCT block, i.e. from the lowest frequency coefficient to the highest frequency coefficient. Inside a block, the DCT coefficients are scanned in a diagonal order, bit plane by bit plane. After each scanned diagonal, a flag is sent telling if there are any new significant coefficients in the rest of the block.

An object of the invention is, inter alia, to provide more efficient encoding. To this end, the invention provides a method of and a device for coding a signal, an encoder, a camera system, a method of decoding, a scalable decoder, a receiver, a scalable bit-stream and a storage medium as defined in the independent claims. Advantageous embodiments are defined in the dependent claims.

According to a first aspect of the invention, a signal comprising blocks of values is coded to obtain a scalable bit-stream by: representing each block as a sequence of bit planes, wherein most significant bits of the values form a most significant bit plane and respective less significant bits of the values form respective less significant bit planes; and scanning and transmitting the values in an order of decreasing bit plane significance, wherein for each bit plane the step of scanning and transmitting is performed in a rectangular scan zone starting from a corner of the block. The corner position depends on the way the coefficients are ordered. Usually, the scan zone starts in an upper left corner of the block. The invention is based on the insight that data for individual blocks may have a bias for either the horizontal or vertical direction. This is especially the case if the values are transform coefficients, but may also be true for other values. Therefore a rectangular scan zone starting in a corner produces a more efficient encoding of the values of the blocks. For images, the invention minimizes necessary image memory in video/image encoders, decoders and transmission of image/video data along channels. The scanning inside the scan zone can be done in any fashion, as long as the encoder and the decoder are synchronized on this scanning. The invention is especially applicable in the field of low-cost, hardware video compression.

A second embodiment according to the invention is characterized in that the coding is performed on each block individually. Using the rectangular scan zone is suitable for processing individual blocks. An advantage of processing individual blocks is that it offers the possibility to work "on the fly" on each received block without the need for gathering and rearranging all blocks of the signal. This reduces the amount of implementation memory. Because the blocks are coded independently, they can be processed in parallel.

In a further embodiment of the invention the step of scanning and transmitting comprises:
  initially marking all values insignificant; and
  performing the following steps for each bit plane until a stop criterion is met:
    transmitting a bit for each significant value in a current bit-plane;
    transmitting an indication whether or not any insignificant values become newly significant in the current bit plane; and
    selecting and transmitting dimensions of the rectangular scan zone for the newly significant values in the current bit plane, followed by an indication for each not previously significant value inside the scan zone whether the value has become newly significant and a sign bit for each newly significant coefficient.

The order of the steps in this embodiment may be changed without departing from the scope of the invention. Newly significant values are marked such that for a next bit-plane they are regarded significant. As long as no value has become newly significant in a previous bit plane, no significant values exist. For such a bit-plane no bits are transmitted for significant values. This is, e.g., the case for a most significant bit-plane.

In an embodiment of the invention, the device is used in a hybrid encoder, the hybrid encoder further comprising a truncator for truncating the scalable bit-stream to obtain an output signal at a certain bit-rate.

In an advantageous embodiment, the device is used in an encoder to furnish the scalable bit-stream to a memory for storing a previous frame. This minimizes the necessary memory, which makes it more feasible to integrate a hybrid coder with the memory on a single chip. A hybrid encoder is an encoder that codes both spatially and temporally by, e.g., a two-dimensional data transformation and motion compensation.

The aforementioned and other aspects of the invention will be apparent from and elucidated with reference to the embodiments described hereinafter.

The drawings only show those elements that are necessary to understand the invention.

In order to generate a bit-stream that can be truncated, the most significant information should be transmitted first, followed by subsequent refinement information. In case of Discrete Cosine Transformation (DCT) coding schemes, which are preferred schemes to the invention, an image is partitioned into rectangular blocks of e.g. 8×8 pixels. Each block is transformed separately with a two-dimensional DCT. Resulting DCT coefficients are quantized and transmitted or stored in a progressive manner, so that the most important information is transmitted first. This can be done by successive quantization, where the coding residue is reduced step by step. After the transformation, most of the energy of the image is concentrated in the low-frequency coefficients, and the rest of the coefficients have very small values. This means that there are many zeros in most significant bit planes.

Figure 1:
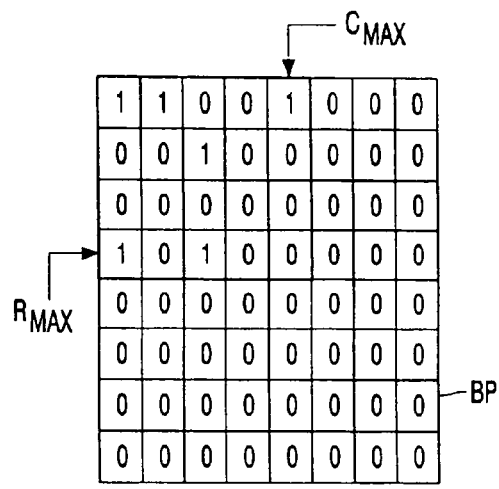
FIG. 1 shows an exemplary bit-plane with a rectangular scan zone according to the invention.

A bit-plane (BP) is a plane that comprises bits of the transmission coefficients with certain significance. An example of such a bit-plane is shown in FIG. 1. This bit-plane BP comprises a bit for each transform coefficient (8×8) with certain significance. A bit-plane comprising most significant bits of all transform coefficients is called a most significant bit plane ($BP_{MSB}$). Further, less significant bits form respective less significant bit-planes. FIG. 1 further shows a rectangular scan zone with dimensions: $R_{MAX}=3$ and $C_{MAX}=4$, wherein $R_{MAX}$ is a maximum row number and $C_{MAX}$ is a maximum column number. Note that position (0,0) represents a bit of a DC coefficient.

Figure 2:
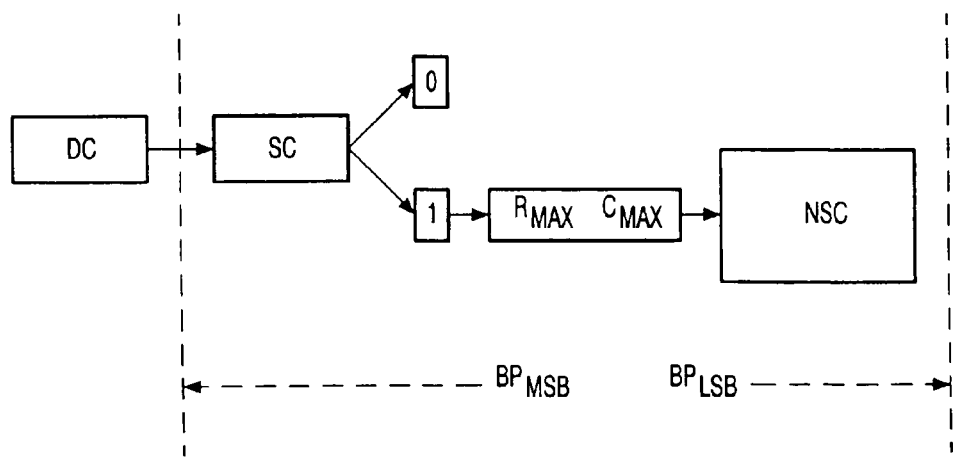
FIG. 2 shows a visualization of a coding technique according to the invention.

A graphical visualization of a coding method according to the invention is presented in FIG. 2, which method will be explained below. In this embodiment the DC coefficient is transmitted entirely at the beginning of the bit-stream. The other DCT coefficients are encoded and transmitted bit-plane by bit-plane, starting with the most significant bit-plane $BP_{MSB}$ (not counting the sign plane). Although this is a preferred embodiment for e.g. hybrid encoders, it is also possible to encode the DC coefficient in the same way as the other DCT coefficients, i.e. bit-plane by bit-plane. While encoding each bit-plane, a distinction is made between significant and insignificant coefficients. A significant coefficient (SC) is a coefficient for which one or more bits have already been transmitted (in a more significant bit plane). An insignificant coefficient is a coefficient for which no bits have been transmitted yet. That is the case if all bits in previous bit-planes were zeros. As long as a coefficient has zeros, it is regarded as insignificant.

The significant and insignificant coefficients have different probability distributions. A bit in the current bit plane of a significant coefficient has about equal probability of being a zero or a one. Therefore, there is not much to be gained by trying to more efficiently transmit it. A bit in an insignificant coefficient, however, is very likely to be a zero. Furthermore, because of the properties of the DCT (and typical images), the significant and insignificant coefficients tend to be clustered. This enables us to efficiently transmit many "insignificant zeroes" by a zoning technique.

Initially all coefficients are marked insignificant. Then, starting with the most significant bit plane $BP_{MSB}$, the encoding is started. An indication (e.g. one bit as shown in FIG. 2: 0 or 1) is transmitted whether any insignificant bits are found in the current bit-plane that become significant, i.e. when a previously insignificant coefficient has a non-zero bit. If these so-called newly significant coefficients (NSC) have been found, their positions are transmitted with aid of the rectangular scan zone as shown in FIG. 1. After the positions of the newly significant coefficients, their sign bits are transmitted. A way of transmitting the positions of the NSC is given below. The bits for the newly significant coefficients do not have to be transmitted, because they are always one. Otherwise, the coefficient would have remained insignificant. The above-described procedure is repeated for each bit plane ($BP_{MSB}$ . . . $BP_{LSB}$) until a certain stop criterion has been met, e.g. a certain bit-rate or quality or just because all bit-planes ($BP_{MSB}$ . . . $BP_{LSB}$) have been put into the bit-stream.

For a certain bit-plane, bits of significant coefficients (zeros and non-zeros) are transmitted automatically before the indication is send whether or not newly-significant coefficients are present in the current bit-plane. Because all coefficients are marked insignificant at the start of the procedure, for the most significant bit-plane $BP_{MSB}$ no significant coefficients exist and only bits are transmitted for the newly significant coefficients. These newly significant coefficients are then marked significant. This means that when the next bit-plane is processed these coefficients are significant and their bits are transmitted automatically. If no newly significant coefficients are found, an indication is sent (e.g. zero-bit) and the coding proceeds with the next bit-plane.

As mentioned above, to encode the positions of newly significant coefficients, the rectangular scan zone is used. The scan zone indicates the area in which newly significant coefficients have been found. The dimensions of the scan zone are determined by outermost positions of the newly significant coefficients. With reference to FIG. 1, $R_{MAX}$ indicates the maximum row number (here: 3) and $C_{MAX}$ the maximum column number (here: 4) wherein a newly significant coefficient has been found. Because the scan zone only indicates the maximum area in which newly significant coefficients have been found, exact positions still need to be transmitted. This is done by sending a single bit for each newly significant coefficient inside the scan zone to indicate whether or not the coefficient has become significant. Since it is not necessary to transmit a bit for the coefficients that were already significant (nor for the DC coefficient in case this coefficient has been transmitted separately), this position coding is very efficient.

The encoding is based on the observation that the coefficients with larger magnitude tend to be close with the lower horizontal or vertical frequencies. Therefore, in the prior art a zig-zag or a diagonal scan order is used. These scan orders are signal-independent and assume that the data is concentrated in the upper left triangular zone of the transformed block. Although this assumption is true on average, the invention is based on the insight that individual DCT blocks often have a bias for either the horizontal or the vertical direction. Therefore, a signal dependent rectangular scan zone as described above (also originating in the upper left corner, i.e. lower frequencies) produces a more efficient encoding of the coefficients. The scanning of this zone can be done in any fashion as long as an encoder and a corresponding decoder are synchronized on this scanning. Possible scan orders are, e.g., diagonal, zigzag, vertical or horizontal.

The rectangular scan zone can differ from one block to another block, but also from one bit-plane to another bit-plane within the same block. When no newly-significant coefficients are found within a block for a certain bit-plane, no scan zone is defined. In this case, only a bit is transmitted to indicate that no newly significant coefficients are present.

Note that in the above-described embodiment, the significant coefficients of a current bit-plane are inserted in the bit-stream before the zoning information and newly significant coefficients for the same bit-plane. This order may be changed without departing from the scope of the invention. The significant coefficients can for example be inserted in the bit-stream after the information concerning the newly significant coefficients.

An increase in coding performance can be achieved at the cost of additional complexity if a part of the bit-stream representing the newly significant coefficients is entropy coded, e.g. arithmetic coded. The zoning information can for example be Huffman coded.

Figure 3:
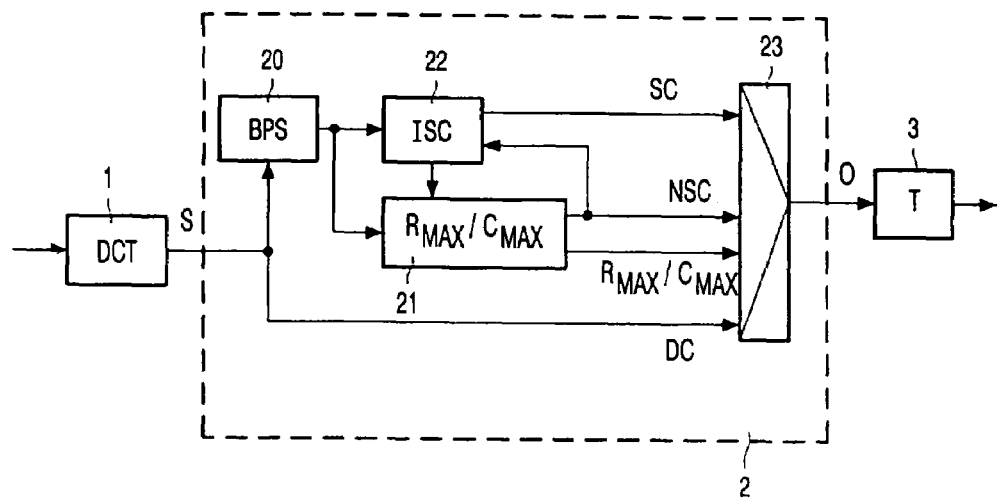
FIG. 3 shows an exemplary embodiment according to the invention.

FIG. 3 shows an exemplary embodiment according to the invention comprising a DCT transformer 1, a scalable coder 2 and a truncator T 3. The scalable coder 2 comprises: a bit plane switch detector (BPS) 20, a scanning unit ($R_{MAX}$/$C_{MAX}$) 21, an index of significant coefficients (ISC) 22 and an output multiplexer 23. An input signal, describing a digitized image, is DCT transformed in the DCT 1 resulting in a signal S. In the scalable coder 2 a DC coefficient is furnished to the output multiplexer 23. After the DC coefficient has been furnished to the multiplexer 23, the bits of the significant coefficients SC indexed in the ISC 22 are forwarded for the current bit-plane detected in BPS 20. In the scanning unit 21, the rectangular scan zone is selected for any newly significant coefficients from the most significant bit-plane $BP_{MSB}$ to the least significant bit-plane $BP_{LSB}$. If newly significant coefficients are present, the values for $R_{MAX}$ and $C_{MAX}$ are determined and furnished to the multiplexer 23, followed by bits for the newly significant coefficients NSC. These bits comprise the position and sign bits of the NSC as already discussed. This process is repeated for each next bit-plane detected in the BPS 20. The NSC are indexed in ISC 22 and regarded as significant in the next bit-plane. The produced scalable bit-stream O can than be truncated to a desired bit-rate by simply truncating the bit-stream at a desired position in truncator 3.

Figure 4:
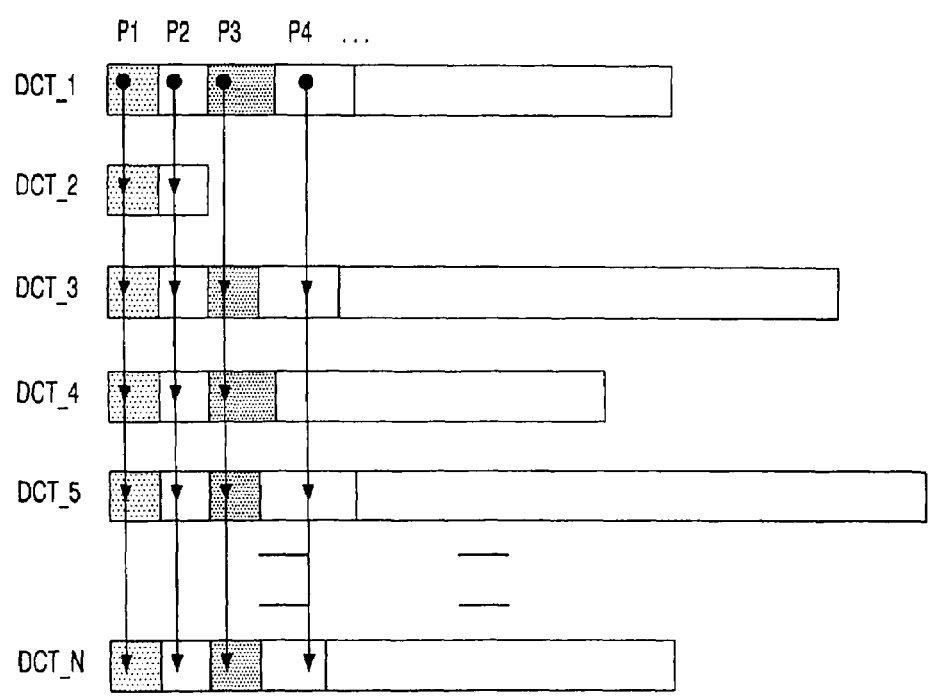
FIG. 4 shows an example of a scalable image coding method according to the invention.

An entire image composed of (DCT) blocks can be coded by coding all DCT blocks separately and concatenating them in a scanning fashion. Another way of coding an entire image is shown in FIG. 4. The image is transmitted in a scalable way, not by concatenating (and truncating if desired) the separate DCT blocks (DCT_1 to DCT_N), but by cyclically scanning the coded DCT blocks and transmitting only a part of the coded transform coefficients (P1, P2, . . . ), e.g. one or a few bits, of the individual blocks DCT_i with i=1 to N. A next scanning pass then obtains a next part of the coded transform coefficients of the DCT blocks. The number of bits in the selected parts can differ for each block or each scanning pass, e.g. depending on the significance of the part of the coded transform coefficients, as illustrated in FIG. 4 for part P3. It is possible to select some bits that represent data of certain significance or a certain coefficient, which are represented by a different amount of bits for different blocks. If a certain DCT block does not have a coded part of certain significance required in the scanning pass, the specific DCT block may be skipped. This is illustrated in FIG. 4 where the block DCT_2 is skipped in the third scanning pass (P3) because DCT_2 does not contain any coded transform coefficients anymore, i.e. the code is exhausted. It is also possible to skip a block in a certain scanning pass, because the significance is only lower than required, illustrated in the fourth scanning pass for DCT_4. It still remains possible to select a next part of the coded transform coefficients of this block DCT_4 in a next scanning pass. In this way, a scalable coding of an entire image is obtained instead of the block-wise scalable coding as obtained when all DCT blocks are individually coded and concatenating in a scanning fashion.

Hybrid video compression schemes, such as MPEG2 and H.263 use an image memory for motion-compensated coding. In VLSI implementations, this image is usually stored in external RAM because of its large size. To reduce overall system costs, a compression of the image is proposed by a factor 4 to 5 before storage, which enables embedding of the image memory on the encoder IC itself. In a DCT domain encoder, the input signal is directly subjected to a DCT outside of the encoding loop. (see FIGS. 5 and 6). This means that motion estimation and compensation need to be performed in the DCT-domain. The local decoding only goes as far as performing a de-quantization (IQ) and inverse MC (IMC). To take advantage of the large number of zero coefficients after quantization (Q) (still present after IQ), a scalable coder (LLC) according to the invention (similar to the scalable coder 2 shown in FIG. 3) is used before storage. A scalable coding method is inherently lossless, but can be quantized from the bit-stream if necessary. Extraction from a memory (MEM) for motion-compensation is performed by a scalable decoder (LLD). Note that almost all of the encoder parts are now situated in the DCT-domain whereas for a traditional, non-DCT domain encoder only a limited part is situated in the DCT-domain.

To control and guarantee the actual storage, scalable compression is used as described above.

Figure 5:
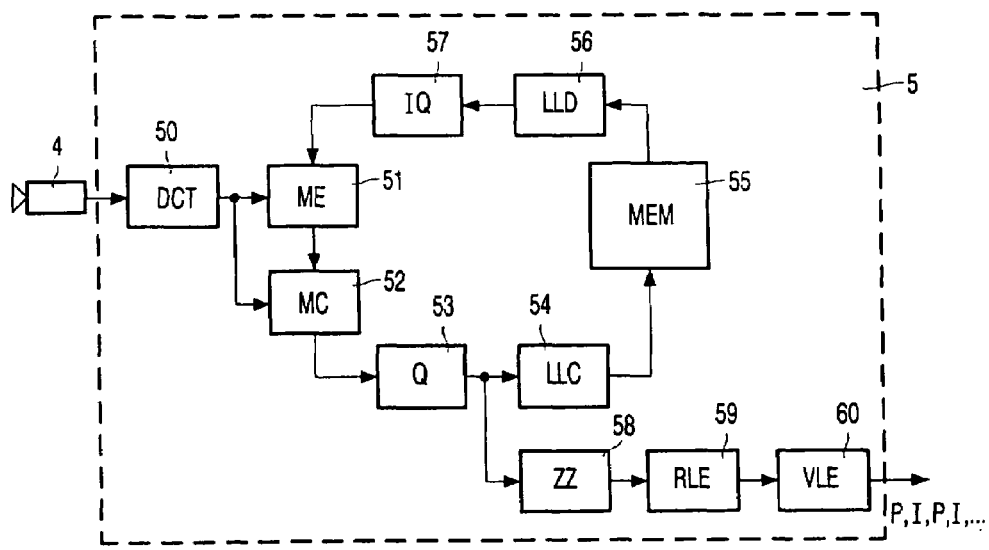
FIGS. 5 and 6 show hybrid encoders according to the invention applied in a camera system, wherein the hybrid encoders use a scalable coder to furnish a scalable bit-stream to a memory.

FIG. 5 shows a camera system comprising a first DCT domain hybrid encoder according to the invention. The hybrid encoder is in this case a so-called 'PIPI' encoder indicating that it encodes alternating I (intra) and P (inter) frames. The camera system comprises a camera 4 and a hybrid encoder 5. A signal generated by the camera 4 is first DCT transformed in DCT 50. Thereafter, the transformed signal is subjected to motion estimation in ME 51 and to motion compensation in MC 52. The motion compensated signal is quantized in Q 53. The quantized signal is further processed by a zig-zag scanner (ZZ) 58, a run-length encoder (RLE) 59 and a variable length encoder (VLE) 60 to obtain, e.g., an MPEG encoded signal. The quantized signal is further scalable coded in an LLC 54 and thereafter furnished to a memory 55. The required size of the memory 55 can be guaranteed by the buffer/rate control mechanism of the encoder 5 itself. This is because in effect only coefficients of an intra frame I are stored in the memory 55. For applications where encoder cost and edit-ability are more important than compression ratio, such as storage applications, this is a suitable encoder. The loop memory 55 is placed just after the quantizer 53 (via the LLC 54), taking almost full advantage of the parent encoder efforts. To obtain a reconstructed frame that can be used in the motion estimator 51, the encoder further comprises a scalable decoder LLD 56 and an inverse quantizer IQ 57, both coupled to the memory 55. The scalable decoder LLD 56 performs an inverse operation of the scalable coder LLC 54.

Figure 6:
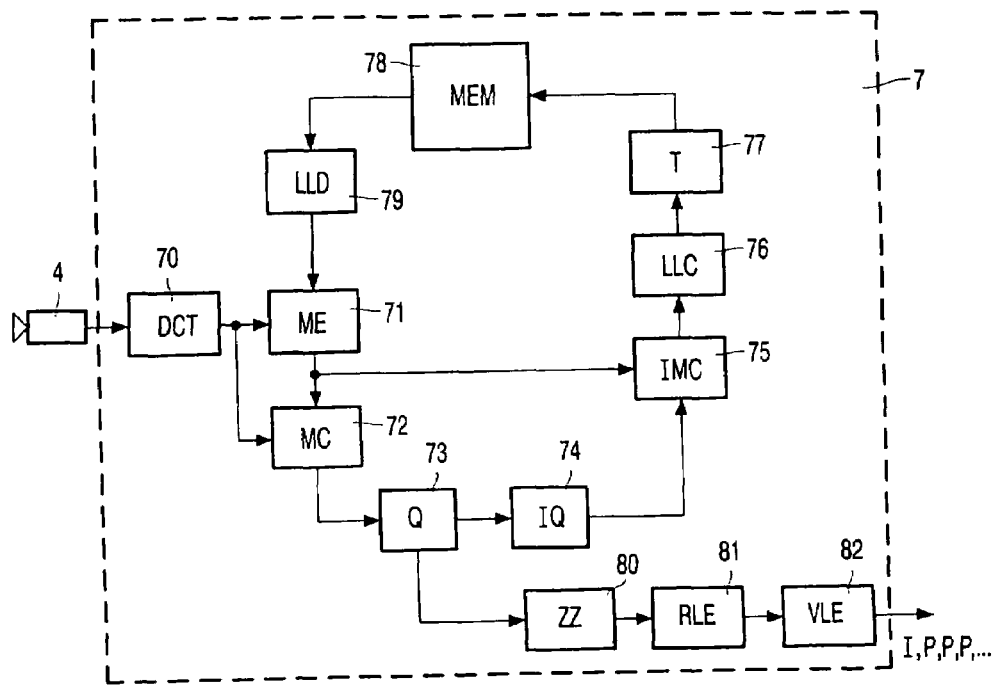

At higher compression ratios, required for lower bit-rates, successive P frames must be used. An architecture of a camera system comprising a multiple P frame encoder 7 is shown in FIG. 6. Similar to FIG. 5, the encoder 7 comprises a DCT 70, an ME 71, an MC 72, a Q 73, a ZZ 80, a RLE 81 and a VLE 82. The Q 73 is coupled via an IQ 74 to an inverse motion compensator (IMC) 75 to obtain a reconstructed signal. In between inter-coded frames P an undefined number of non-zero coefficients can now slip through the IMC mechanism 75 directly to a loop memory 78, bypassing the Q 73. A method to actively control the storage demands is to quantize the signals going into the loop memory 78. Some amount of quantization is permissible as long as the image quality stays (significantly) higher than the targeted output quality of the encoder, and the number of successive P frames is limited. This quantizing is performed by simply stripping a certain percentage of the bit-stream for each DCT block, according to the scalable coding principle. A separate buffer control mechanism can profile the image contents and adjust this percentage on the fly. The quantization information is not needed for the decoding phase that is performed in a LLD 79. The additional quantizing is performed by truncator T 77 on a scalable bit-stream produces by an LLC 76. A fall-back mechanism may be employed by switching to intra-blocks if the number of non-zero coefficients is higher than can be accepted. The embodiments shown in FIGS. 5 and 6 produce a standard MPEG or similar encoded bit-stream. This bit-stream can be decoded by a standard decoder.

Figure 7:
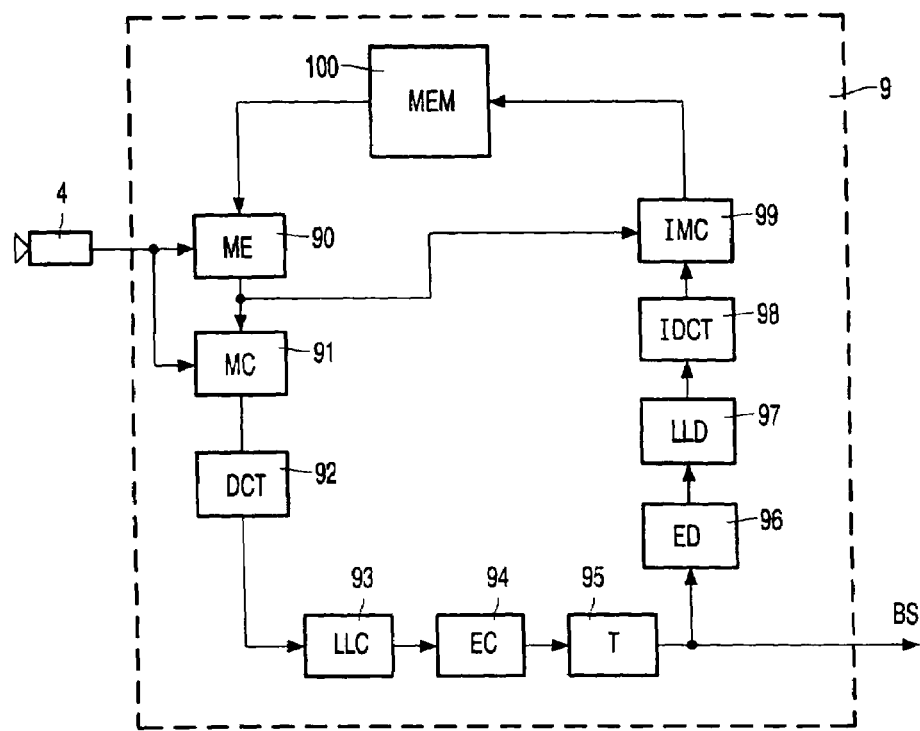
FIG. 7 shows a camera system comprising a further hybrid encoder according to the invention which uses a scalable coder to furnish a scalable bit-stream to an output of the hybrid encoder.

Although in the aforementioned embodiments scalable coding is used within an encoder, i.e. to furnish a scalable bit-stream to a loop-memory, scalable coding can also be used for transmitting a scalable bit-stream to a remote decoder. The receiver then needs means for decoding the scalable bit-stream. FIG. 7 shows a camera system comprising the camera 4 and a hybrid encoder 9. The hybrid encoder 9 comprises: a motion estimator (ME) 90, a motion compensator (MC) 91, a DCT transformer 92, a scalable coder (LLC) 93 (see FIG. 3), an entropy coder (EC) 94 (optional) and a truncator (T) 95. The encoder further comprises an entropy decoder (ED) 96 (optional), a scalable decoder (LLD) 97, an inverse DCT transformer (IDCT) 98, an inverse motion compensator (IMC) 99 and a memory (MEM) 100. Instead of the standard zig-zag scanning, run-length coding and variable length coding, the scalable coder LLC 93 is used to furnish a scalable bit-stream to an output of the hybrid coder 9. The scalable bit-stream is entropy coded in EC 94, e.g. arithmetic or Huffman coding. The embodiment according to FIG. 7 comprises a truncator (T) 95 in the output path that truncates the scalable bit-stream to obtain an output bit-stream BS with a desired bit-rate. This embodiment provides a convenient, low-complexity bit-rate control that adapts the bit-rate faster and better than an embodiment that uses a feedback loop to adapt a quantizer. Combinations of the embodiment shown in FIG. 7 with the embodiments shown in FIGS. 5 and 6 are feasible. If motion compensation is not required, an embodiment mainly comprising the DCT 92, the scalable coder LLC 93 and the truncator T 95 may be used (similar to FIG. 3).

Figure 8:
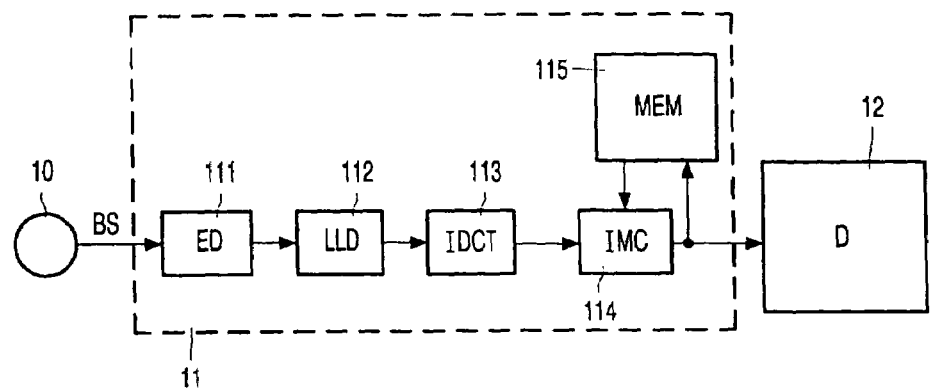
FIG. 8 shows a decoder for decoding the scalable bit-stream produced by the hybrid encoder of FIG. 7.

Because the output of the embodiment of FIG. 7 is not a standard MPEG-2 output, a non MPEG-2 standard decoder is required to decode the bit-stream BS. A receiver comprising a scalable decoder 11 is shown in FIG. 8. A scalable bit-stream BS is received in the decoder 11, in particular in the entropy decoder ED 111. The source of the bit-stream BS may be a storage medium 10, but can also be a transmission over some kind of medium. After entropy decoding, the bit-stream BS is scalable decoded in LLD 112. Further elements of the decoder are, an in verse DCT transformer (IDCT) 113, an inverse motion compensator (IMC) 114 and a memory (MEM) 115 which are similar to their counterparts in the encoder 9. Bits of coefficients that are affected by a truncation can be set to zero, to expected values or to random values by the decoder 11. The decoded bit-stream can be displayed on a display D 12. Depending on the complexity of the encoder, the ED 111 or the IMC 114 and the MEM 115 can be omitted.

In summary, the invention proposes a method of and a device for coding a signal to obtain a scalable bit-stream. The signal comprises blocks of values. Each block is represented as a sequence of bit planes and the values are scanned and transmitted in an order of decreasing bit plane significance. For each bit plane the scanning and transmitting are performed in a rectangular scan zone starting from a corner of the block (usually an upper-left corner). Preferably, the scanning and transmitting is performed on each block individually. The produced bit-stream is quantized to a desired bit-rate by simple truncating the bit-stream at a desired position. Initially all values are marked insignificant. For each bit-plane, a bit is transmitted for each significant value, i.e. a value that has been newly significant in a previous bit-plane. Besides the significant values, an indication is transmitted whether or not any insignificant values become newly significant in the current bit plane. The dimensions of the rectangular scan zone are selected and transmitted for the newly significant values in the current bit plane. This is followed by an indication for each not previously significant value inside the scan zone whether the value has become newly significant and a sign bit for each newly significant value. After that a next bit plane is processed. The values may be transform coefficients.

It should be noted that the above-mentioned embodiments illustrate rather than limit the invention, and that those skilled in the art will be able to design many alternative embodiments without departing from the scope of the appended claims. Images may be divided in sub-images, wherein the invention is applied to the sub-images rather than the image. In the claims, any reference sings placed between parentheses shall not be construed as limiting the claim. The word "comprising" does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware.

The invention claimed is:

1. A method of coding (2) a signal (S) comprising blocks of values to obtain a scalable bit-stream (O,BS), the method comprising the steps of:

representing (20) each block as a sequence of bit planes (BP), wherein most significant bits of the values form a most significant bit plane ($BP_{MSB}$) and respective less significant bits of the values form respective less significant bit planes; and scanning and transmitting (21,23) significant coefficients values in an order of decreasing bit plane (BP) significance;

wherein for each bit plane the step of scanning and transmitting (21,23) is performed in a rectangular scan zone ($R_{MAX}$, $C_{MAX}$) starting from a corner of the block, wherein $R_{MAX}$ represents a maximum row number and $C_{MAX}$ represents a maximum column number determined as the outermost positions of newly significant coefficients within each bit plane and said $R_{MAX}$ and $C_{MAX}$ values are transmitted in said bit-stream.

2. The method as claimed in claim 1, wherein the values are transform coefficients.

3. The method as claimed in claim 1, wherein the coding (2) is performed on each block individually to obtain respective scalable bit-streams for respective individual blocks.

4. The method as claimed in claim 1,
wherein the step of scanning and transmitting (21,23) comprises:
initially marking (22) all values insignificant; and
performing the following steps for each bit-plane ($BP_{MSB}$ ... $BP_{LSB}$) until a stop criterion is met:
  transmitting (22,23) a bit for each significant value (SC) in a current bit plane (BP);
  transmitting (21,23) an indication whether or not any insignificant values become newly significant in the current bit plane; and
  selecting and transmitting (21,23) an indication for each not previously significant value inside the scan zone whether the value has become newly significant (NSC) and a sign bit for each newly significant value (NSC) following said transmitted $R_{MAX}$ and $C_{MAX}$.

5. The method as claimed in claim 4,
wherein parts of the bit-stream representing the newly significant values (NSC) are entropy coded.

6. The method as claimed in claim 3,
wherein a scalable bit-stream is obtained by cyclically and sequentially scanning selected parts (P1,P2, ...) of the respective scalable bit-streams DCT_1 ... DCT_N) of the respective individual blocks.

7. A device (2) for coding (2) a signal (S) comprising blocks of values to obtain a scalable bit-stream (O,BS), the device comprising:
  means for representing (20) each block as a sequence of bit planes (BP), wherein most significant bits of the values form a most significant bit plane ($BP_{MSB}$) and respective less significant bits of the values form respective less significant bit planes; and
  means for scanning and transmitting (21,23) the values in an order of decreasing bit plane (BP) significance;
  wherein for each bit plane the means for scanning and transmitting (21,23) have been arranged to perform the scanning and transmitting for each bit plane in a rectangular scan zone ($R_{MAX}$, $C_{MAX}$) starting from an upper left corner of the block wherein $R_{MAX}$ represents a maximum row number and $C_{MAX}$ represents a maximum column number determined as the outermost positions of newly significant coefficients within each bit plane and said $R_{MAX}$ and $C_{MAX}$ values are transmitted in said bit-stream.

8. The device (93) as claimed in claim 7, further comprising:
  a truncator (95) for truncating the scalable bit-stream (O,BS) at a certain bit-rate.

9. The device (54,76) as claimed in claim 7, further comprising:
  a memory (55,78) for storing a previous frame-wherein the scalable bit-stream (O,BS) is furnished to the memory (55,78).

10. A camera system comprising:
  a camera (4); and
  an encoder for coding (2) a signal (S) comprising blocks of values to obtain a scalable bit-stream (O,BS), the device comprising:
    means for representing (20) each block as a sequence of bit planes (BP), wherein most significant bits of the values form a most significant bit plane ($BP_{MSB}$) and respective less significant bits of the values form respective less significant bit planes; and
    means for scanning and transmitting (21,23) the values in an order of decreasing bit plane (BP) significance;
    wherein for each bit plane the means for scanning and transmitting (21,23) have been arranged to perform the scanning and transmitting for each bit plane in a rectangular scan zone ($R_{MAX}$, $C_{MAX}$) starting from an upper left corner of the block, wherein $R_{MAX}$ represents a maximum row number and $C_{MAX}$ represents a maximum column number determined as the outermost positions of newly significant coefficients within each bit plane and said $R_{MAX}$ and $C_{MAX}$ values are transmitted in bit-stream.

11. A method of decoding (11) comprising:
receiving (111) a scalable bit-stream (O,BS) comprising blocks of values, the values for each block being available in an order of decreasing bit plane significance and for each bit plane scanned in a rectangular scan zone ($R_{MAX}$, $C_{MAX}$) starting from an upper left corner of the block, wherein $R_{MAX}$ represents a maximum row number and $C_{MAX}$ represents a maximum column number determined as the outermost positions and received in the bit-stream;
regenerating (112) the blocks of values from the scalable bit-stream (O,BS); and
decoding (113–115) the blocks of values.

12. A scalable decoder (11) comprising:
means for receiving (111) a scalable bit-stream (O,BS) comprising blocks of values, the values for each block being available in an order of decreasing bit plane significance and for each bit plane scanned in a rectangular scan zone ($R_{MAX}$, $C_{MAX}$) starting from an upper left corner of the block, wherein $R_{MAX}$ represents a maximum row number and $C_{MAX}$ represents a maximum column number determined as the outermost positions of newly significant coefficients within each bit plane and received in the bit-stream;
means for regenerating (112) the blocks of values from the scalable bit-stream (O,BS); and
means for decoding (113–115) the blocks of values.

13. The decoder as claimed in claim 12 further comprising:
means for outputting (12) the decoded values.

14. A method for scanning a scalable bit-stream (BS) comprising blocks of values, the values for each block being available in an order of decreasing bit plane significance, said method comprising the step of:
scanning each bit plane in a rectangular scan zone ($R_{MAX}$, $C_{MAX}$) starting from an upper left corner of a selected block, wherein $R_{MAX}$ represents a maximum row number and $C_{MAX}$ represents a maximum column number determined as the outermost positions of newly significant coefficients within each bit plane and said $R_{MAX}$ and $C_{MAX}$ values are transmitted in said bit-stream.

15. The method as recited in claim 14, wherein said bit-stream (BS) is recorded on a storage medium (10).

* * * * *